United States Patent Office 2,740,594
Patented Apr. 3, 1956

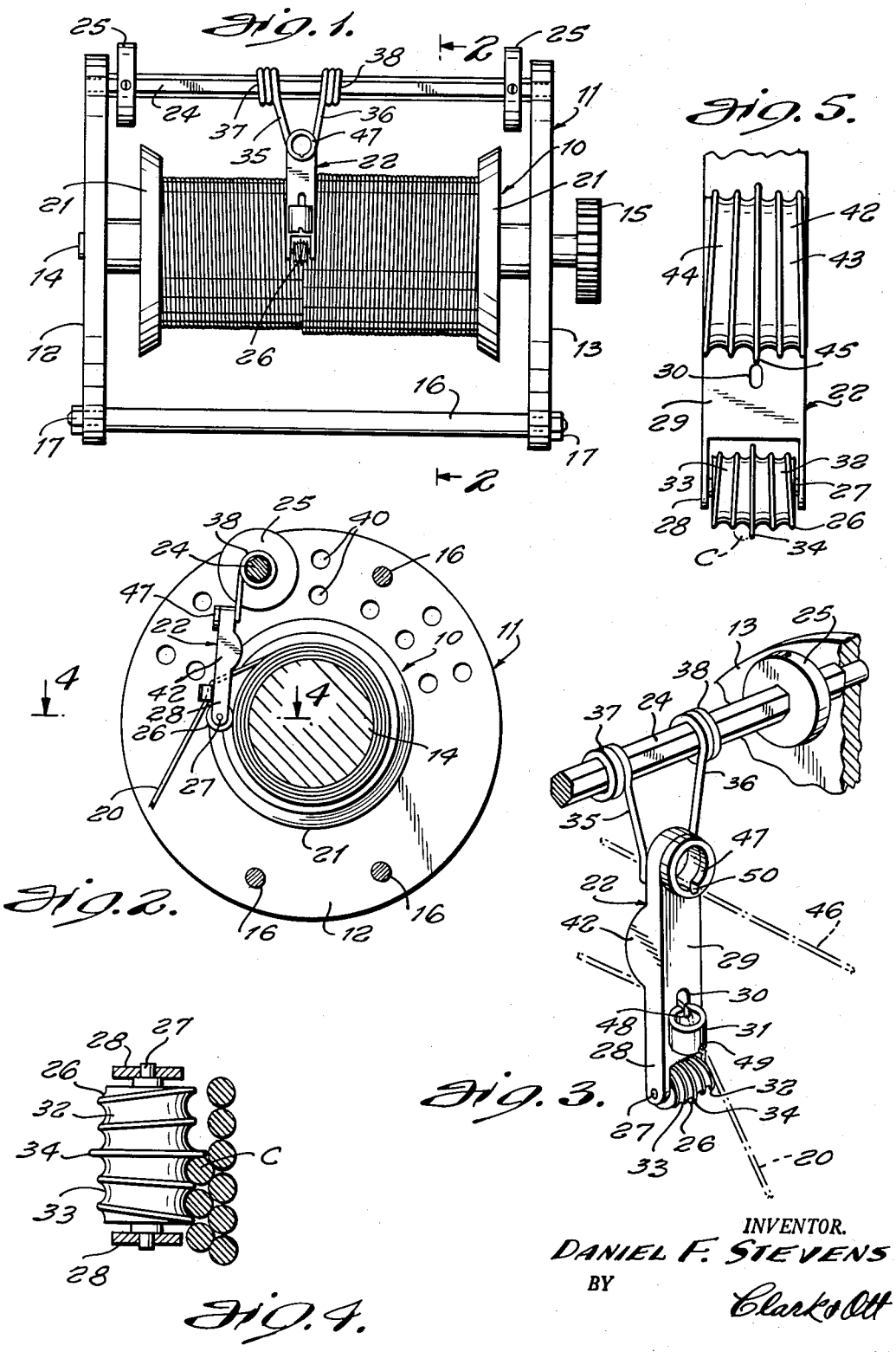

2,740,594

GUIDE FOR WINDING A STRAND ON A SPOOL, BOBBIN AND THE LIKE

Daniel F. Stevens, Syracuse, N. Y.

Application June 4, 1953, Serial No. 359,511

3 Claims. (Cl. 242—158)

This invention relates to a guide for uniformly winding a strand on a spool, bobbin and the like.

An object of the invention is to provide a guide for guiding and tensioning the strand onto a rotating spool, bobbin and the like in uniform formation and in superimposed layers.

Another object of the invention is to provide a guide of said character through which the strand is trained and which is freely movable laterally back and forth with the winding of the strand on the spool for training the strand in uniform successive convolutions thereon.

Still another object of the invention is to provide a guide which is engageable with each convolution as it is wound on the spool to move the guide laterally to thereby train the strand for the winding of the succeeding convolution.

With the foregoing and other objects in view, reference is now made to the following specification and accompanying drawings in which the preferred embodiment of the invention is illustrated.

In the drawings:

Fig. 1 is a view in elevation of a reel in which a spool is rotatably mounted and having a device for guiding the strand constructed in accordance with the invention.

Fig. 2 is a sectional view taken approximately on line 2—2 of Fig. 1.

Fig. 3 is an enlarged perspective view of the device and showing a fragmentary portion of the reel.

Fig. 4 is an enlarged fragmentary view of a rotating guide forming part of the device.

Fig. 5 is an under side view of a fragmentary portion of the device showing alternate guides.

The guide is adapted for use in connection with any form of device for rotatably mounting a spool, bobbin and the like. In the embodiment illustrated in the accompanying drawings, a spool 10 is mounted for rotation in a reel 11 having opposite walls 12 and 13 between which the spool 10 is mounted on a shaft 14 extending through bearing openings in said wall and on which shaft a gear 15 is affixed for engagement with driving means for turning the spool. The walls 12 and 13 of the reel 11 are connected by cross bars 16 having reduced outer ends which extend through openings in said walls and are engaged by nuts 17 to secure the said walls in spaced apart relation with the spool 10 disposed therebetween.

In order to guide a strand of material such as the strand 20 for winding the same on the spool 10 between the flanged ends 21 thereof, a guide member 22 is provided which is mounted for free longitudinal sliding movement on a cross bar 24 between the enlarged ends 25 thereof. The ends 25 provide stops for limiting the movement of the guide member 22 and which ends are adjustable on the guide for accommodating different lengths of spools. The guide member 22 is provided with a rotating guide 26 which is normally disposed centrally on a line extending medially through the spool 10. The rotating guide 26 is mounted for rotation on a shaft 27 arranged in bearing openings in the protruding ends of the sides 28 of the guide member 22. The wall 29 of the guide member is formed with an opening 30 through which the strand 20 is trained onto the spool. Below the opening 30 an annular member 31 is affixed to the wall 29 of the guide member through which the strand 20 is trained prior to engagement through the opening 30, as illustrated in Figs. 2 and 3 of the drawings.

The rotating guide 26 is formed with right and left hand threaded portions 32 and 33 between which a medial rib 34 is provided which extends outwardly beyond the threaded portions in right angular relation with the longitudinal axis thereof. The guide member 22 is provided with arms 35 and 36 having spirally wound annular upper ends 37 and 38 to slidably receive the bar 24 which is of polygonal formation in cross-section such as of hexagonal shape to thereby provide limited contact of the annular upper ends 37 and 38 therewith so as to render the guide freely slidable on the bar.

In winding the strand 20 on the spool 10, the reel 11 is turned to draw the strand 20 through the annular member 31 and thence through the opening 30 and onto the top of the spool. The strand is affixed to the spool at one side thereof and the rib 34 will be engaged by the second convolution as the same is wound thereon, as indicated in detail in Fig. 4 of the drawings. As succeeding convolutions are wound on the spool, the guide member 22 will swing outwardly on the cross bar 24 so that the rib 34 will engage the outer peripheries thereof while the right hand threaded portion 32 will engage between the previously wound convolutions so as to effect movement of the guide member longitudinally of the bar 24 from one side to the other to train the strand 20 onto the spool. The next layer will be superimposed upon the previous layer with the guide member 22 swinging outwardly and moving from one side of the spool to the other in the reverse direction. When this takes place, the rib 34 will engage the outer periphery of each last wound convolution thereof while the left hand threaded portion 33 will engage the two last wound convolutions.

The walls 12 and 13 are provided with a plurality of openings 40 in which the ends of the bar 24 are mounted and these openings are radially arranged so that the guide member 22 may be adjusted to different locations to dispose the rotating guide 26 in proper position for spools and bobbins of different capacity and of different diameters and for correct depth of engagement of the rib with the last wound convolution.

Instead of utilizing the rotating guide 26, a guide 42 formed integrally with the guide member 22 may be optionally employed. The guide 42 is of semi-cylindrical formation and is provided with right and left hand threaded portions 43 and 44 and between the said threaded portions a medial rib 45 is provided which extends outwardly beyond the threaded portions at right angles to the plane of the guide member 22. In using the guide 42 the bar 24 is mounted in two of the lower openings 40 so as to dispose the guide 42 substantially central on a line extending medially through the spool 10.

When using the guide 42 the strand indicated by the reference character 46 is trained through an opening 47 in the guide member 22 and thence about the top of the spool. As the spool 10 is rotated to wind the strand thereon, the rib 45 engages against the side of the turn or convolution of the strand as the same is wound thereon and the threaded portion 43 engages about the upper portion of the two last wound convolutions or turns so as to move the guide member 22 in one direction on the bar 24 with the winding of the strand on the spool. When a layer has been wound on the spool the guide member 22 is moved in the opposite direction by engagement of the rib 45 against the side of the turn or convolution as the same is wound on the spool and the threaded portion 44 engaging about the upper portions of the two last wound turns or convolutions.

The guide member 22 is provided with a notch 48 in the upper edge of the annular member 31 which extends through the opening 30 and with a notch 49 in the lower edge thereof for receiving and training the strand 20 in alignment with the last wound convolution when utilizing the rotating guide 26 and to provide slight frictional tension on the strand. The wall 29 of the guide member 22 is also provided with a notch 50 at the bottom of the opening 47 for receiving and training the strand 46 when the guide 42 is employed to dispose the strand 46 in alignment with the last wound convolution and to provide slight frictional tension thereon.

In the drawings the guide member 22 is mounted on the reel 11 for receiving the strand fed thereto from the left. It is to be understood, however, that the guide member 22 may be disposed on the opposite side of the spool for receiving the strand from the right.

While the preferred embodiment of the invention has been illustrated in the drawings and described in the specification, it is to be understood that the invention is not so limited and shall cover and include any variations and modifications which fall within the scope thereof.

What is claimed is:

1. In a guide for training a strand onto a rotating member for winding the strand thereon in superimposed layers, a guide member having an opening through which the strand is trained onto the rotating member, means mounting said guide member for swinging movement toward and away from said rotating member and for sliding movement in front of said rotating member, and said guide member having means formed with right and left hand grooved portions and a rib extending outwardly beyond said grooved portions medially thereof, said rib and said right hand grooved portion continuously engaging with the two last wound convolutions as the same are wound on the rotating member for moving the guide member in one direction across the front of the rotating member with the winding of a layer of the strand thereon from the left hand side of the rotating member to the right hand side thereof, and said left hand grooved portion and said rib continuously engaging with the two last wound convolutions as the same are wound on the rotating member for moving the guide member in the opposite direction across the front of the rotating member with the winding of another layer of the strand thereon from the right hand side of the rotating member to the left hand side thereof.

2. In a guide for training a strand onto a rotating member for winding the strand thereon in superimposed layers, a mounting in which said rotating member is journaled for rotation, a cross bar carried by said mounting, a guide member having an opening through which the strand is trained onto the rotating member, said guide member being slidable on said cross bar for movement of the guide member in front of the rotating member and being swingable on said cross bar toward and away from said rotating member, and said guide member having a rotating element formed with right and left hand grooved portions and a rib extending outwardly beyond said grooved portions medially thereof, said rib and said right hand grooved portion having continuous rotating engagement with the last wound convolution as the same is wound on the rotating member for moving the guide member in one direction across the front of the rotating member with the winding of a layer of the strand thereon from the left hand side of the rotating member to the right hand side thereof, and said left hand grooved portion and said rib having continuous rotating engagement with the last wound convolution as the same is wound on the rotating member for moving the guide member in the opposite direction across the front of the rotating member with the winding of another layer of the strand thereon from the right hand side of the rotating member to the left hand side thereof.

3. In a guide for training a strand onto a spool of a reel, a cross bar of polygonal shape in cross-section carried by said reel, stop means slidable on said cross bar for disposing the same in relative adjusted positions, a guide member having an opening provided with a notch through which the strand is trained onto the spool, said guide member having circular openings therethrough for slidably receiving said cross bar for movement of the guide member in front of the spool between said stop members, said guide member having an arcuate shaped rib formed integrally therewith and right and left hand grooved portions alongside of said rib with the rib located therebetween, said rib and said right hand grooved portion having continuous engagement with the convolutions as the same are wound on the spool for moving the guide member in one direction across the front of the spool with the winding of the strand thereon from the left hand side to the right hand side of the spool, and said rib and left hand grooved portion having continuous engagement with the convolutions as the same are wound on the spool for moving the guide member in the opposite direction across the front of the spool with the winding of the strand thereon from the right hand side to the left hand side thereof, and said cross bar being adjustable on the reel for adjusting the guide member with reference to the spool.

References Cited in the file of this patent

UNITED STATES PATENTS

| 521,480 | Sharp | June 19, 1894 |
| 761,120 | Williams | May 31, 1904 |
| 1,767,938 | Monnier et al. | June 24, 1930 |
| 1,973,446 | Rosenquist | Sept. 11, 1934 |
| 2,243,624 | Gazet | May 27, 1941 |

FOREIGN PATENTS

| 274,353 | Italy | May 19, 1930 |
| 282,777 | Italy | Feb. 21, 1931 |
| 450,706 | Italy | Aug. 9, 1949 |
| 566,435 | Germany | Dec. 16, 1932 |
| 656,661 | Great Britain | Aug. 29, 1951 |